US012462354B2

(12) United States Patent
Lim et al.

(10) Patent No.: US 12,462,354 B2
(45) Date of Patent: Nov. 4, 2025

(54) ELECTRONIC DEVICE AND IMAGE PROCESSING METHOD THEREOF

(71) Applicant: Samsung Electronics Co., Ltd., Suwon-si (KR)

(72) Inventors: Kwangyong Lim, Suwon-si (KR); Sungoh Kim, Suwon-si (KR); Soohyeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 18/149,903

(22) Filed: Jan. 4, 2023

(65) Prior Publication Data
US 2023/0147540 A1 May 11, 2023

Related U.S. Application Data

(63) Continuation of application No. PCT/KR2022/005946, filed on Apr. 26, 2022.

(30) Foreign Application Priority Data

Apr. 26, 2021 (KR) .................. 10-2021-0053940
Jun. 25, 2021 (KR) .................. 10-2021-0083410

(51) Int. Cl.
*H04M 1/72403* (2021.01)
*G06F 3/14* (2006.01)
(Continued)

(52) U.S. Cl.
CPC .................. *G06T 5/73* (2024.01); *G06F 3/14* (2013.01); *G06T 7/0002* (2013.01); *G06V 10/761* (2022.01); *G06T 2207/30168* (2013.01)

(58) Field of Classification Search
CPC .................. G06T 5/73; G06T 7/0002; G06T 2207/30168; G06T 2207/10024;
(Continued)

(56) References Cited

U.S. PATENT DOCUMENTS

2014/0304637 A1 10/2014 Jiri et al.
2016/0125221 A1* 5/2016 Kim ...................... H04N 23/64
382/117
(Continued)

FOREIGN PATENT DOCUMENTS

JP 2006-050494 A 2/2006
JP 2018-045396 A 3/2018
(Continued)

OTHER PUBLICATIONS

Korean Office Action dated Aug. 21, 2025, issued in Korean Application No. 10-2021-0083410.

*Primary Examiner* — Andrew M Moyer
*Assistant Examiner* — Dylan John Mendez Muniz
(74) *Attorney, Agent, or Firm* — Jefferson IP Law, LLP

(57) ABSTRACT

An electronic device is provided. The electronic device includes memory for storing at least one image, a display, and at least one processor electrically connected with the memory and display, and the at least one processor may obtain a request related to a quality of a first image among the at least one image, in response to the request, determine whether detecting a plurality of degradations of the first image is completed before obtaining the request, as a result of determining, if detecting the plurality of the degradations is not completed, determine whether a degradation improvement condition is satisfied for the first image, detect the plurality of the degradations in response to satisfying the degradation improvement condition, determine whether a criterion for improving the plurality of the degradations is satisfied, in response to satisfying the criterion, display on the display a second image in which degradation improvement is performed.

20 Claims, 10 Drawing Sheets

(51) Int. Cl.
*G06T 5/73* (2024.01)
*G06T 7/00* (2017.01)
*G06V 10/74* (2022.01)

(58) Field of Classification Search
CPC ............ G06T 2207/20084; G06F 3/14; G06V 10/761; H04M 2250/52; H04M 1/72403
See application file for complete search history.

(56) References Cited

U.S. PATENT DOCUMENTS

| | | |
|---|---|---|
| 2019/0026609 A1 | 1/2019 | Shen et al. |
| 2019/0378247 A1 | 12/2019 | Huang et al. |
| 2020/0118282 A1 | 4/2020 | Patriarche |
| 2020/0344411 A1 | 10/2020 | Cragg et al. |
| 2020/0349674 A1 | 11/2020 | Ramanujam et al. |
| 2020/0372612 A1* | 11/2020 | Higaki ...................... G06T 5/60 |
| 2021/0012462 A1 | 1/2021 | Kim et al. |
| 2021/0104023 A1 | 4/2021 | Cao et al. |
| 2021/0110518 A1 | 4/2021 | Chui et al. |
| 2022/0094846 A1* | 3/2022 | Lv .......................... H04N 23/64 |

FOREIGN PATENT DOCUMENTS

| | | | |
|---|---|---|---|
| JP | 6700965 B2 | | 5/2020 |
| JP | 2020102124 A | * | 7/2020 |
| JP | 2020-191046 A | | 11/2020 |
| JP | 2021-015490 A | | 2/2021 |
| KR | 10-1548700 B1 | | 9/2015 |
| KR | 10-2018-0051367 A | | 5/2018 |
| KR | 10-2021-0007234 A | | 1/2021 |

\* cited by examiner

ELECTRONIC DEVICE AND IMAGE PROCESSING METHOD THEREOF

CROSS-REFERENCE TO RELATED APPLICATION(S)

This application is a U.S. National Stage application under 35 U.S.C. § 371 of an International application number PCT/KR2022/005946, filed on Apr. 26, 2022, which is based on and claims priority of a Korean patent application number 10-2021-0053940, filed on Apr. 26, 2021, in the Korean Intellectual Property Office, and of a Korean patent application number 10-2021-0083410, filed on Jun. 25, 2021, in the Korean Intellectual Property Office the disclosure of each of which is incorporated by reference herein in its entirety.

TECHNICAL FIELD

The disclosure relates to an electronic device and a method for performing an image processing operation, and relate to a technique for performing a processing operation to improve an image quality.

BACKGROUND ART

In recent, electronic devices of various types such as a mobile communication terminal, a personal digital assistant (PDA), an electrical notebook, a smart phone, a tablet personal computer (PC), a wearable device, are widely used with advance of digital technology. To support and increase functionality, hardware and software of the electronic device are continuously improved.

For example, the electronic device may acquire an image (e.g., a raw image) from its embedded camera, correct the acquired image, and provide the corrected image to a user. The electronic device may correct the image using a processor (e.g., an image signal processor). Also, the processor may process the image using an image quality enhancement algorithm, and thus provide the image of the improved image quality.

The electronic device may detect a specific degradation of the image acquired from the camera to provide the corrected image, and improve it. For example, the electronic device may select an image to enhance in quality in an idle state (e.g., not in use while charging the electronic device) of the electronic device, detect degradations in the image, and generate a corrected image by improving the degradations.

The above information is presented as background information only to assist with an understanding of the disclosure. No determination has been made, and no assertion is made, as to whether any of the above might be applicable as prior art with regard to the disclosure.

DISCLOSURE

Technical Problem

To select an image to improve its image quality and detect and improve degradations in the image, an electronic device may require a user's manual manipulation or take a considerable time. Accordingly, a conventional electronic device may not immediately provide the corrected image at a user's request. For example, the conventional electronic device may not provide immediate degradation improvement for the image for which the user requests the image quality improvement. As another example, the conventional electronic device, only if it is not idle, may perform a degradation improvement operation on the image requested for the quality improvement.

In addition, the conventional electronic device may improve only one degradation despite an environment where a plurality of degradations is detected in the selected image and the plurality of the degradations may be processed. Hence, the conventional electronic device provides the image with the low image quality improvement by providing a simple filter or providing simple tone and brightness correction, and correction for one degradation.

Aspects of the disclosure are to address at least the above-mentioned problems and/or disadvantages and to provide at least the advantages described below. Accordingly, an aspect of the disclosure is to provide an electronic device and image processing method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory for storing at least one image, a display, and at least one processor electrically connected with the memory and the display, and the at least one processor may obtain a request related to a quality of a first image among the at least one image, in response to the request, determine whether detecting a plurality of degradations of the first image is completed before obtaining the request, as a result of determining, if detecting the plurality of the degradations is not completed, determine whether a degradation improvement condition is satisfied for the first image, detect the plurality of the degradations in response to satisfying the degradation improvement condition, determine whether a criterion for improving the plurality of the degradations is satisfied, in response to satisfying the criterion, display on the display a second image in which degradation improvement is performed on the plurality of the degradations, and if the criterion is not satisfied, display on the display a third image in which degradation improvement is performed on one of the plurality of the degradations.

In accordance with another aspect of the disclosure, an operating method of an electronic device is provided. The operating method includes a memory which stores at least one image according to an embodiment of the disclosure may include obtaining a request related to a quality of a first image among the at least one image, in response to the request, determining whether detecting a plurality of degradations of the first image is completed before obtaining the request, as a result of determining, if detecting the plurality of the degradations is not completed, determining whether a degradation improvement condition is satisfied for the first image, in response to satisfying the degradation improvement condition, detecting the plurality of the degradations, determining whether a criterion for improving the plurality of the degradations is satisfied, and based on whether the criterion is satisfied, displaying a second image in which degradation improvement is performed on the plurality of the degradations or a third image in which degradation improvement is performed on one of the plurality of the degradations.

In accordance with another aspect of the disclosure, an electronic device is provided. The electronic device includes a memory for storing at least one image, a first application, a second application and a third application, a display, and at least one processor electrically connected with the memory and the display, and the at least one processor may obtain a request related to a quality of a first image among the at least one image by executing the first application, in response to the request, determine whether detecting a plurality of degradations of the first image is completed before obtaining the request, as a result of determining, in response to not completing the detection of the plurality of the degradations, determine whether a degradation improvement condition is satisfied for the first image by executing the third application, in response to satisfying the degradation improvement condition, detect the plurality of the degradations, determine whether a criterion for improving the plurality of the degradations is satisfied, in response to satisfying the criterion, generate a second image in which degradation improvement is performed on the plurality of the degradations, in response to not satisfying the criterion, generate a third image in which degradation improvement is performed on one of the plurality of the degradations, and control the display to display the second image or the third image through the first application.

Advantageous Effects

According to various embodiments of the disclosure, an electronic device may detect degradations of a selected image while the electronic device is in use, improve the degradations and provide the image of the improved quality, without waiting for an idle state of the electronic device at a request of a user.

An electronic device according to various embodiments of the present disclosure, may detect a plurality of degradation in an image, and generate and provide an image with the plurality of the degradations improved.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
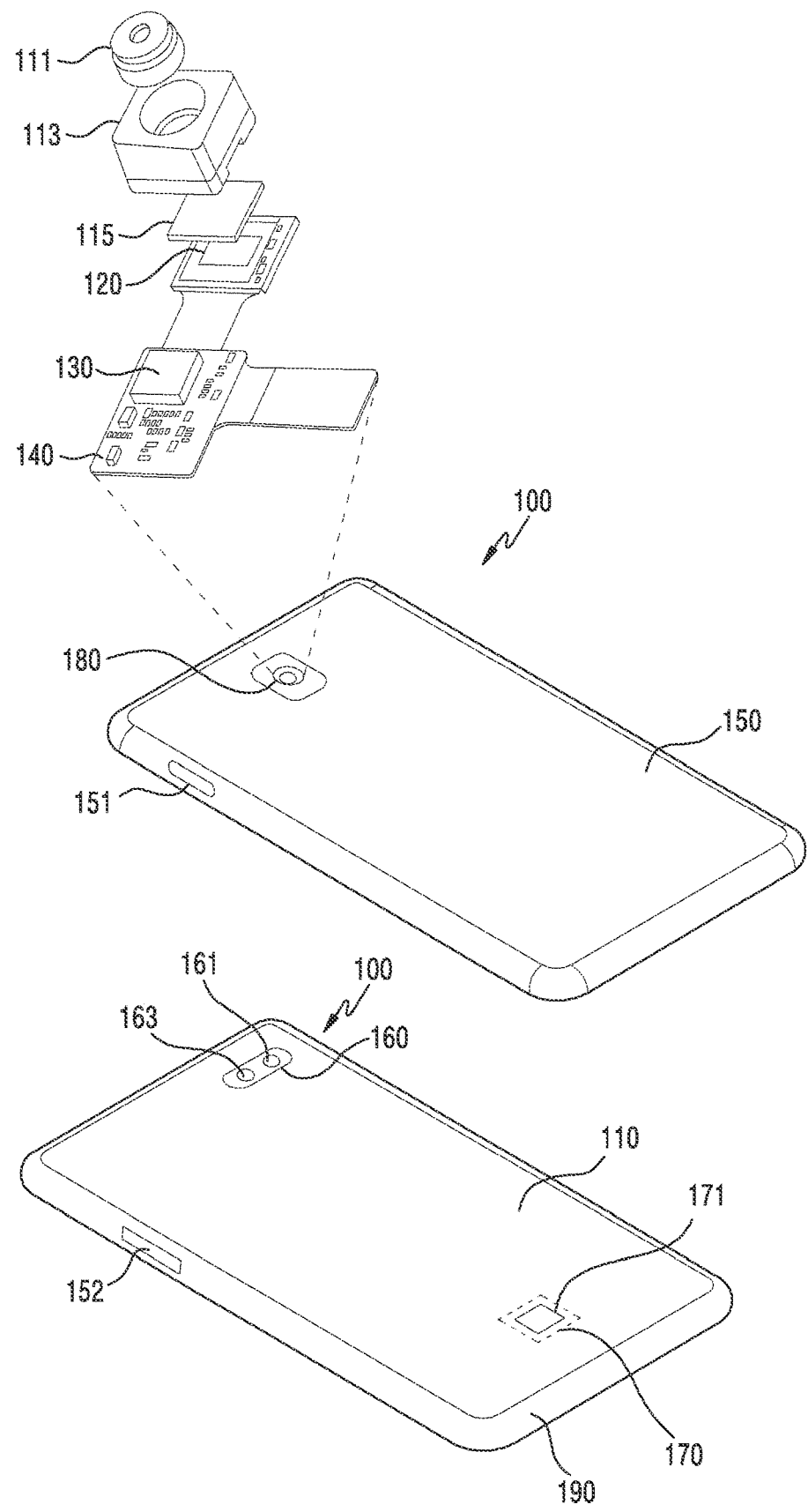
FIG. 1 illustrates a structure of an electronic device and a camera module according to an embodiment of the disclosure.

FIG. 1 illustrates a structure of an electronic device and a camera module according to an embodiment of the disclosure.

FIG. 1 is a diagram schematically showing an exterior of the electronic device 100 with the camera module 180 mounted and the camera module 180 according to an embodiment. The embodiment of FIG. 1 is illustrated and described based on a mobile device, for example, a smart phone, but those skilled in the art shall clearly understand that it may be applied to various electronic devices or an electronic device with a camera mounted among mobile devices.

Referring to FIG. 1, a display 110 may be disposed in a front surface of an electronic device 100 according to an embodiment. In an embodiment, the display 110 may occupy most of the front surface of the electronic device 100. The front surface of the electronic device 100 may include the display 110, and a bezel 190 area surrounding at least some edges of the display 110. The display 110 may include a flat area and a curved area extending from the flat area toward a side surface of the electronic device 100. The electronic device 100 illustrated in FIG. 1 is an example, and various embodiments are possible. For example, the display 110 of the electronic device 100 may include only the flat area without the curved area or may include the curved area only at one edge rather than both sides. Also, in an embodiment, the curved area may extend toward a rear surface of the electronic device and the electronic device 100 may include an additional flat area.

In an embodiment, the electronic device 100 may additionally include a speaker, a receiver, a front camera 161, a proximity sensor, a home key, and the like. The electronic device 100 according to an embodiment may be provided by integrating a rear cover 150 with a main body of the electronic device. In another embodiment, the rear cover 150 may be separated from the main body of the electronic device 100, to replace a battery. The rear cover 150 may be referred to as a battery cover or a back cover.

In an embodiment, a first area 170 of the display 110 may include a fingerprint sensor 171 for user's fingerprint recognition. The fingerprint sensor 171 may be disposed on a lower layer of the display 110, not to be viewed by the user or to be hardly viewed. Also, in addition to the fingerprint sensor 171, a sensor for additional user/biometric authentication may be disposed in some area of the display 110. In another embodiment, a sensor for the user/biometric authentication may be disposed in one area of the bezel 190. For example, an infrared (IR) sensor for iris authentication may be exposed through one area of the display 110, or may be exposed through one area of the bezel 190.

In an embodiment, the front camera 161 may be disposed in a second area 160 of the front surface of the electronic device 100. While the embodiment of FIG. 1 illustrates that the front camera 161 is exposed through one area of the display 110, the front camera 161 may be exposed through the bezel 190 in another embodiment. In yet another embodiment (not shown), the electronic device 100 may include at least one or more of an audio module, a sensor module (e.g., a sensor 163), the camera module (e.g., the front camera 161), and a light emitting element (not shown), in the rear surface of the second area 160. For example, the camera module may be disposed to face the front surface and/or the side surface, in the front surface and/or the side surface of the electronic device 100. For example, the front camera 161 may be an under display camera (UDC), not visually exposed in the second area 160.

In an embodiment, the electronic device 100 may include one or more front cameras 161. For example, the electronic device 100 may include two front cameras such as a first front camera and a second front camera. In an embodiment, the first front camera and the second front camera may be cameras of the same type having the same specifications (e.g., pixels), but the first front camera and the second front camera may be implemented as cameras of different specifications, in another embodiment. The electronic device 100 may support a function related to a dual camera (e.g., three dimensional (3D) imaging, auto focus, etc.) through the two front cameras. The mentioned explanation on the front cameras may be applied to a rear camera of the electronic device 100 in the identical or similar manner.

In an embodiment, various hardware or sensors 163 assisting photographing such as a flash may be additionally disposed in the electronic device 100. For example, the electronic device 100 may include a distance sensor (e.g., a time of flight (TOF) sensor) for detecting a distance between a subject and the electronic device 100. The distance sensor may be applied to both the front camera 161 and/or the rear camera. The distance sensor may be separately disposed or included and disposed in the front camera 161 and/or the rear camera.

In an embodiment, at least one physical key may be disposed on a side portion of the electronic device 100. For example, a first function key 151 for turning on/off the display 110 or turning on/off the electronic device 100 may be disposed on a right edge based on the front surface of the electronic device 100. In an embodiment, a second function key 152 for controlling volume of the electronic device 100 or controlling screen brightness may be disposed on a left edge based on the front surface of the electronic device 100. Besides, an additional button or key may be disposed on the front surface or the rear surface of the electronic device 100. For example, a physical button or a touch button mapped to a specific function may be disposed in a lower area of the front bezel (e.g., bezel 190).

The electronic device 100 shown in FIG. 1 corresponds to one example, and does not limit the shape of the device to which the technical idea disclosed in the disclosure is applied. For example, by adopting a flexible display and a hinge structure, the technical idea of the disclosure may be applied to a foldable electronic device which is foldable in a horizontal direction or a vertical direction, a rollable electronic device which may be rolled, a tablet or a notebook computer.

Referring to FIG. 1, the electronic device 100 according to an embodiment may include the camera module 180. The camera module 180 may include a lens assembly 111, a housing 113, an infrared cut filter 115, and an image sensor 120. The electronic device 100 may include an image signal processor (ISP) 130 electrically connected with the image sensor 120. In an embodiment, it may be understood that the ISP 130 is included in the camera module 180, and in another embodiment, it may be understood that the ISP 130 is separated from the camera module 180 and configured to be included in a processor (e.g., a processor 210 of FIG. 2).

In an embodiment, the lens assembly 111 may differ in number, arrangement, type and so on of the lens depending on the front camera 161 and the rear camera. Depending on the type of the lens assembly 111, the front camera 161 and the rear camera may have different characteristics (e.g., a focal length, a maximum magnification, etc.). The lens may move back and forth along an optical axis, and may operate to clearly capture a target object which is a subject by changing its focal length.

In one embodiment, the camera module 180 may include the housing 113 for mounting at least one coil surrounding a periphery of a barrel based on the barrel (not shown) for mounting at least one or more lenses aligned on the optical axis and the optical axis and/or a magnet. In an embodiment, the camera module 180 may perform a stabilization function (e.g., optical image stabilization (OIS)) of the image acquired with the image sensor 120, using the at least one coil and/or the magnet (e.g., a Lorentz type actuator, a solenoid type actuator) included in the housing 113. For example, the at least one coil and the magnet may electromagnetically interoperate under control of a control circuit. For example, under the control of the processor, the camera module 180 may control electromagnetic force by controlling a direction and/or an intensity of current passing through the at least one coil, and move (or, rotate) the lens assembly 111 and/or at least a part of a lens carrier (not shown) including the lens assembly 111 in a direction substantially perpendicular to the optical axis (not shown) using the Lorentz force by the electromagnetic force.

In an embodiment, the camera module 180 may use other scheme for the image stabilization function. For example, the camera module 180 may use video digital image stabilization (VDIS). In an embodiment, the camera module 180 may include a scheme for correcting image shakes, by performing software processing on a data output value of the image sensor 120. For example, the camera module 180 may extract a motion vector based on a different image between a frame and a frame of the image through the VDIS which is the digital shake correction, and increase sharpness through the image processing. In addition, the camera module 180 may extract the motion vector based on the image through the VDIS, and recognize a motion of the subject besides the shake of the electronic device 100 as a shake.

In an embodiment, the infrared cut filter 115 may be disposed on an upper surface of the image sensor 120. The image of the subject passing through the lens may be in part filtered by the infrared cut filter 115 and then detected by the image sensor 120.

In an embodiment, the image sensor 120 may be disposed on an upper surface of a printed circuit board (e.g., a printed circuit board (PCB), a printed board assembly (PBA), a flexible PCB (FPCB), or a rigid-flexible PCB (RFPCB)). The image sensor 120 may be electrically connected with the ISP 130 connected to the printed circuit board 140 by a connector. An FPCB or a cable may be used as the connector.

In an embodiment, the image sensor 120 may be a complementary metal oxide semiconductor (CMOS) sensor or a charged coupled device (CCD) sensor. A plurality of individual pixels is integrated in the image sensor 120, and each individual pixel may include a micro lens, a color filter and a photodiode. Each individual pixel is a kind of a photodetector and may convert incoming light into an electrical signal. The photodetector may include a photodiode (PD). For example, the image sensor 120 may amplify current generated by the light received through the lens assembly 111 through a photoelectric effect of a light receiving element. For example, each individual pixel may include a photoelectric transformation element (or a position sensitive detector (PSD)) and a plurality of transistors.

In an embodiment, light information of the subject incident through the lens assembly 111 may be converted into an electrical signal by the image sensor 120 and inputted to the ISP 130.

In an embodiment, if the ISP 130 and the image sensor 120 are physically separated, a sensor interface conforming to an appropriate standard may electrically connect the image sensor 120 and the ISP 130.

In an embodiment, the ISP 130 may image-process the electrically converted image data. The process in the ISP 130 may be divided into pre-ISP (hereafter, pre-processing) and an ISP chain (hereafter, post-processing). Image processing before a demosaicing process may indicate the pre-processing, and image processing after the demosaicing process may indicate the post-processing. The pre-processing process may include 3A processing, lens shading correction, edge enhancement, dead pixel correction and knee correction. The 3A may include at least one of auto white balance (AWB), auto exposure (AE), and auto focusing (AF). The post-processing process may include at least one of sensor index value changing, tuning parameter changing, and aspect ratio adjustment. The post-processing process may include processing the image data outputted from the image sensor 120 or image data outputted from a scaler. The ISP 130 may adjust at least one of contrast, sharpness, saturation, and dithering of the image through the post-processing process. Herein, the contrast, sharpness, and saturation adjustment procedures may be carried out in a YUV color space, and the dithering procedure may be carried out in a red green blue (RGB) color space. Part of the pre-processing process may be performed in the post-processing process, or part of the post-processing process may be performed in the pre-processing process. In addition, part of the pre-processing process may be overlapped with part of the post-processing process.

In an embodiment, the camera module 180 may be disposed on the front surface, as well as the rear surface of the electronic device 100. Also, the electronic device 100 may include a plurality of camera modules, as well as one camera module 180 for camera performance improvement. For example, the electronic device 100 may further include the front camera 161 for video call or self-camera photography. The front camera 161 may support relatively lower pixels than the rear camera module. The front camera 161 may be relatively smaller than the camera module 180 of the rear camera.

Figure 2:
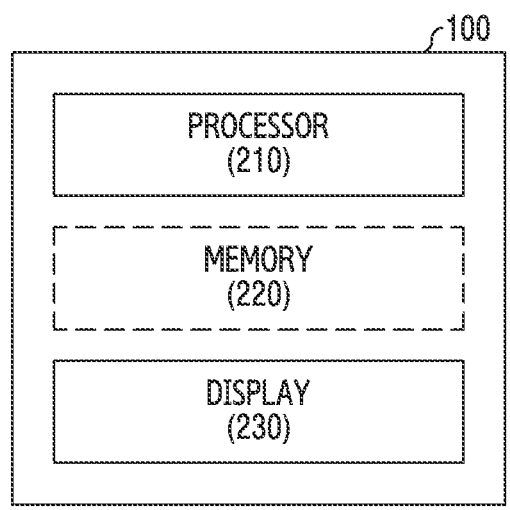
FIG. 2 is a block diagram of an electronic device according to an embodiment of the disclosure.

FIG. 2 is a block diagram showing a hardware configuration of an electronic device according to an embodiment of the disclosure.

Referring to FIG. 2, an electronic device 100 may include a processor 210, a memory 220 and a display 230. The processor 210 according to an embodiment may be electrically or operatively connected with the memory 220 and the display 230. According to various embodiments, the electronic device 100 may include an additional component in addition to the components shown in FIG. 2, or may omit at least one of the components shown in FIG. 2. The configuration explained in FIG. 1 may be explained in brief or may be omitted in the configuration of FIG. 2.

According to an embodiment, the processor 210 may execute operation or data processing related to control and/or communication of at least one other components of the electronic device 100 using instructions stored in the memory 220 of the electronic device 100. According to an embodiment, it may be understood that the processor 2110 includes at least one processor. For example, it may be understood that the processor 210 includes at least one of a central processing unit (CPU), a graphics processing unit (GPU), a micro controller unit (MCU), a sensor hub, a supplementary processor, a communication processor, an application processor, an application specific integrated circuit (ASIC), field programmable gate arrays (FPGA), an ISP and/or a communication processor (CP), and may have a plurality of cores. According to an embodiment, the processor 210 may provide power to the camera module 180. In addition, the processor 210 may perform at least one image processing of continuous shooting image data (CSID), imaging front end (IFE), image processing engine (IPE), or joint photographic experts group (JPEG) on image data obtained from the camera module 180.

According to an embodiment, the memory 220 may store instructions for, when executed, causing the processor 210 to process data or to control the component of the electronic device 100 to perform operations of the electronic device 100. According to an embodiment, the memory 220 may store at least one application for performing various functions. For example, the memory 220 may store an application which performs a function for improving degradations of the image. According to an embodiment, the memory 220 may store image data acquired through the camera of the electronic device 100. Hence, the memory 220 may store at least one image. Thus, the memory 220 may store a plurality of images.

According to an embodiment, the memory 220 may store at least one application for performing the image processing. For example, the memory 220 may store a first application (e.g., a first application 310 of FIG. 3) for displaying the image through the display 230, a second application (e.g., a second application 320 of FIG. 3) for selecting a stored image and performing a background function to improve the quality and a third application (e.g., a third application 330 of FIG. 3) for processing the image degradation. At least one for performing the image processing according to an embodiment shall be elucidated by referring to FIG. 3.

According to an embodiment, the display 230 may include a liquid crystal display (LCD), a light emitting diode (LED) display or an organic LED (OLED) display. According to an embodiment, the display 230 may display various contents (e.g., a text, an image, a video, an icon, and/or a symbol, etc.). For example, the display 230 may display at least one image of at least one image stored in the memory 220. In addition, the display 230 may display a list indicating at least one image stored in the memory 220. The list may include a thumbnails image of at least one image. According to an embodiment, a screen displayed on the display 230 shall be elucidated by referring to FIG. 3.

According to an embodiment, the processor 210 may obtain a request related to a quality of a first image among at least one image stored in the memory 220. For example, the processor 210 may obtain a request indicating the quality improvement of the first image (hereafter, a 'quality improvement request') among at least one image from the user of the electronic device 100. According to an embodiment, the quality improvement request for the first image may be obtained through a touch operation to the display 230.

According to an embodiment, in response to obtaining the quality improvement request of the first image, the processor 210 may determine whether detection of a plurality of degradations is completed in the first image before obtaining the request. For example, the processor 210 may determine whether detection of the plurality of degradations is completed in the first image, or whether the degradation detection is not yet performed. In an embodiment, detecting the plurality of the degradations in the first image may be carried out while the electronic device 100 is idle. According to an embodiment, the processor 210 may determine whether detecting the plurality of the degradations is performed in the first image, based on data including attribute information of the first image.

According to an embodiment, if detecting the plurality of the degradations is not completed in the first image, the processor 210 may determine whether a condition for improving the degradations of the first image is satisfied. For example, the processor 210 may set a resolution range for improving the image degradations, and determine whether a resolution of the first image falls within the range. If the resolution of the first image falls within the range, the processor 210 may determine that the condition for improving the degradations of the first image is satisfied. As another example, the processor 210 may evaluate aesthetics of the first image, and determine based on the evaluation result whether the condition for improving the degradations of the first image is satisfied. The processor 210 may evaluate the aesthetics of the first image using an artificial intelligence (AI) algorithm through an image quality determining unit 332 to be described with reference to FIG. 3, and determine that the degradation improvement condition is satisfied if an evaluation score exceeds a preset reference value.

According to an embodiment, if the degradation improvement condition for the first image is satisfied, the processor 210 may detect the plurality of the degradations in the first image. According to various embodiments, the degradations may include various degradations among image components. For example, the processor 210 may detect resolution, low luminance, image brightness, high dynamic range (HDR), blur, noise and other various degradations of the first image.

According to an embodiment, the processor 210 may detect the plurality of the degradations in the first image, and determine whether a criterion for improving the plurality of the detected degradations is satisfied. For example, the processor 210 may determine that the criterion for improving the plurality of the degradations is not satisfied if processing the plurality of the degradations of the first image is not greater in the quality improvement than processing one degradation. According to an embodiment, the processor 210 may obtain a first sample image from the first image, and determine whether the criterion for improving the plurality of the degradations is satisfied using the first sample image. The first sample image may correspond to some area of the first image. Alternatively, the first sample image may be a downscaled image of the first image. Determining whether the criterion is satisfied according to an embodiment shall be elucidated by referring to FIG. 3.

According to an embodiment, if the criterion for improving the plurality of the degradations of the first image is satisfied, and there is an image improved in degradation for the plurality of the degradations, the processor 210 may display the degradation-improved image on the display 230.

According to an embodiment, if the criterion for the first image is satisfied, the processor 210 may improve the plurality of the degradations of the first image. For example, the processor 210 may perform an operation for improving the plurality of the degradations of the first image. The processor 210 may perform the operation for improving the plurality of the degradations using a degradation processing module stored in the memory 220. According to an embodiment, the processor 210 may improve the plurality of the degradations of the first image sequentially or overlappingly. According to an embodiment, the processor 210 may generate a second image by improving the plurality of the degradations of the first image.

According to an embodiment, if the criterion for the first image is not satisfied, the processor 210 may select one degradation from the plurality of the degradations of the first image, and perform an operation for improving the selected one degradation. For example, the processor 210 may select the degradation of the highest priority or the worst degradation from the plurality of the degradations of the first image, and improve the one selected degradation. According to an embodiment, the processor 210 may generate a third image by improving one degradation of the plurality of the degradations of the first image.

According to an embodiment, the processor 210 may display the second image or the third image on the display 230. According to various embodiments, the processor 210 may display the second image or the third image on the display 230 in various manners. For example, the processor 210 may display the first image or the second image together or display the first image or the third image together. For example, if generating the second image by improving the plurality of the degradations of the first image, the processor 210 may display the first image or the second image together. As another example, if generating the third image by improving one degradation of the plurality of the degradations of the first image, the processor 210 may display the first image or the third image together. Hence, the user of the electronic device 100 may compare the images before/after the quality improvement of the first image.

Figure 3:
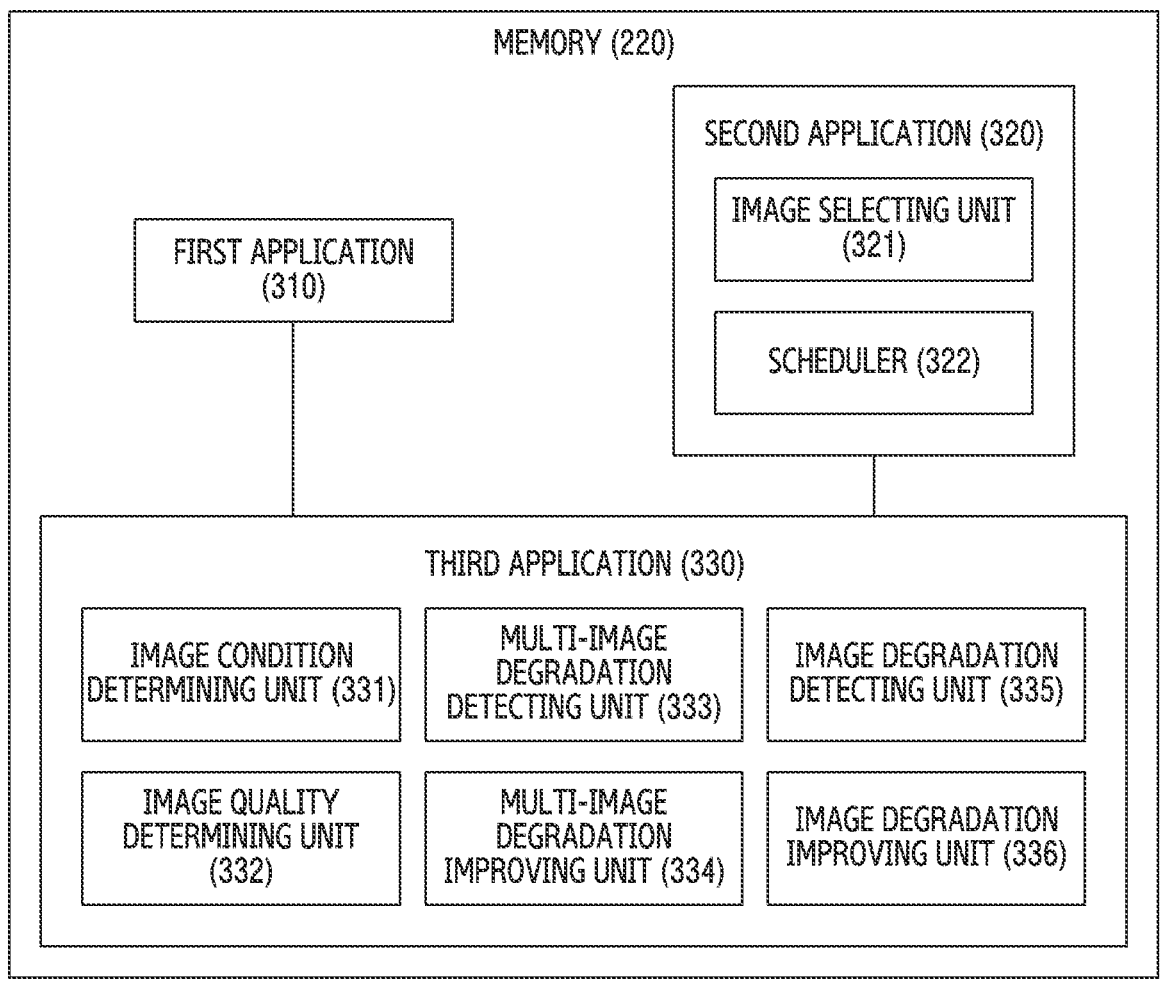
FIG. 3 is a block diagram showing a configuration of applications for image processing of an electronic device according to an embodiment of the disclosure.

FIG. 3 is a block diagram showing a configuration of applications for image processing of an electronic device according to an embodiment of the disclosure.

Referring to FIG. 3, a memory 220 may store a first application 310, a second application 320 and/or a third application 330. According to various embodiments, the first application 310, the second application 320 and/or the third application 330 may be implemented as one application, or may be implemented as a plurality of applications. For example, the first application 310, the second application 320 and/or the third application 330 are divided and represented according to their function, and may be implemented as one application which carries out all of their functions. As another example, the first application 310, the second application 320 and/or the third application 330 may be implemented as a plurality of applications by subdividing their functions.

According to an embodiment, the first application 310, the second application 320 and/or the third application 330 stored in the memory 220 may be executed through the processor 210. That is, the processor 210 may perform various functions by executing the application stored in the memory 220. Descriptions overlapping with those described with reference to FIG. 2 will be omitted.

According to an embodiment, the first application 310 (e.g., a gallery application) may perform a function for managing at least one image stored in the memory 220. In addition, the first application 310 may perform a function for displaying at least one image of at least one image on the display 230. According to an embodiment, the first application 310 may perform a function for displaying an image selected by the user among the at least one image or a function for obtaining a request related to the image quality from the user.

According to an embodiment, the second application 320 may include an image selecting unit 312 and a scheduler 322. According to an embodiment, the second application 320 may manage at least one image stored in the memory 220 with a media database. For example, the image selecting unit 321 may determine whether there is an image added to the memory 220, and if the image is added, store (add) the added image into the media database. In addition, the image selecting unit 321 may select an image for processing the degradation in the idle state through the scheduler 322.

According to an embodiment, the scheduler 322 may determine an image for processing the degradation according to priorities among images included in the media database. For example, the scheduler 322 may determine an image stored through a social networking service (SNS) as the first image for processing the degradation. According to an embodiment, the scheduler 322 may determine an image stored through the SNS, an image downloaded on the internet, an image captured through the camera module 180, and a cloud backup image in order as the image for processing the degradation. According to an embodiment, the scheduler 322 may determine a fourth image of which the degradation detection and/or processing is not finished among the images included in the media database.

According to an embodiment, the second application 320 may perform a function of controlling the order of the whole operations for improving the degradation of at least one image through the third application 330. Hence, the second application 320 may detect and improve the degradations of the image stored in the electronic device 100 or a cloud, using an application programming interface (API) of the third application 330. According to an embodiment, the second application 320 may be a background application executed in the idle state of the electronic device 100. As another example, the second application 320 may be executed in a use state of the electronic device 100. According to an embodiment, the second application 320 may be an application not supporting a user interaction. Thus, the processor 210 may not display a screen based on the second application 320 through the display 230.

Figure 6:
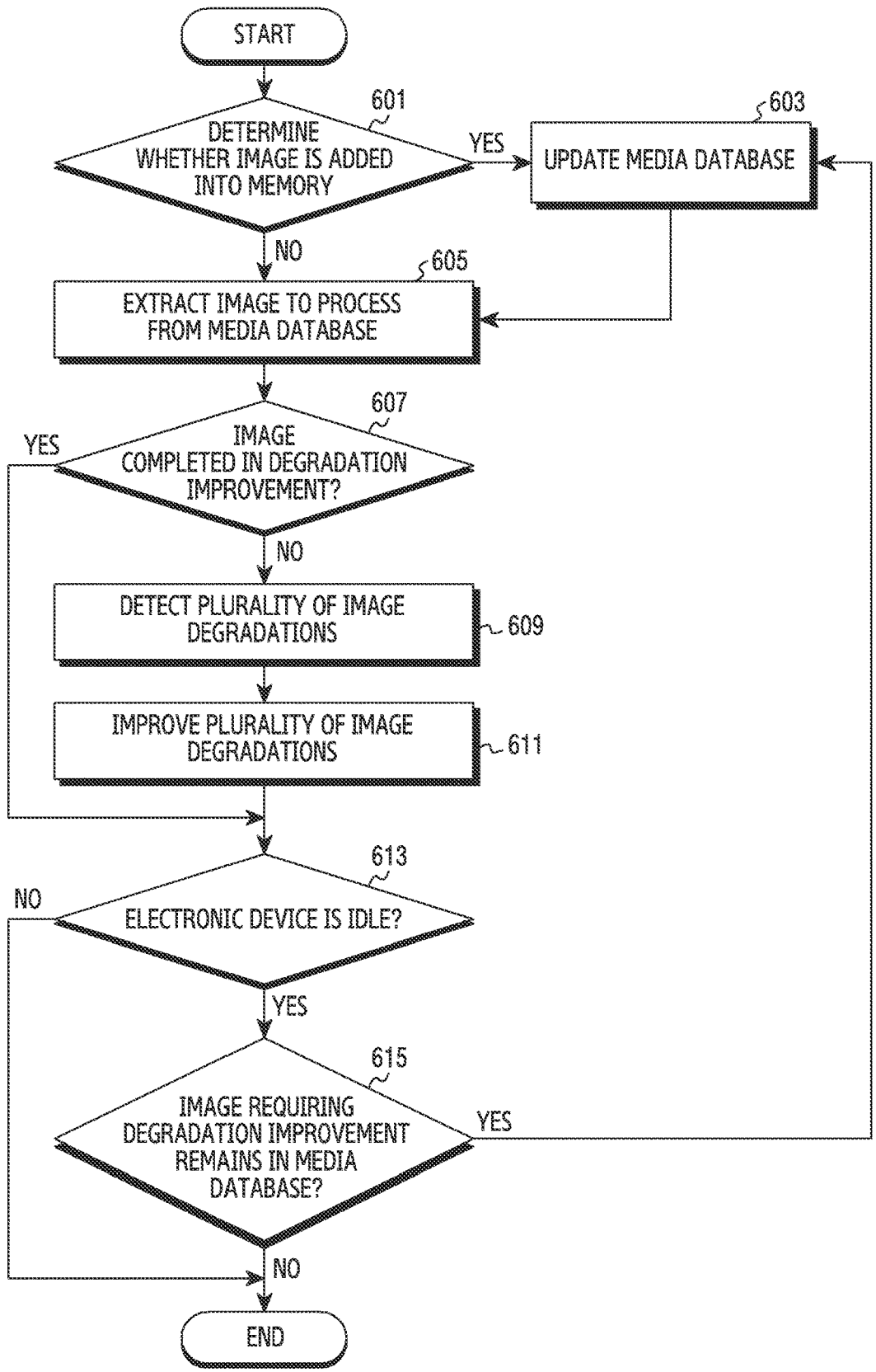
FIG. 6 is a flowchart showing that an electronic device in an idle state detects and improves degradations in an image according to an embodiment of the disclosure.

Executing the second application 320 according to an embodiment shall be described by referring to FIG. 6.

According to an embodiment, the third application 330 may perform a function of detecting and improving a plurality of degradations in the image determined by the first application 310 or the second application 320. According to an embodiment, the third application 330 may include an image condition determining unit 331, an image quality determining unit 332, a multi-image degradation detecting unit 333, a multi-image degradation improving unit 334, an image degradation detecting unit 335 and/or an image degradation improving unit 336.

According to an embodiment, the third application 330 may be called from the first application 310 and/or the second application 320 to perform the function. According to an embodiment, the image condition determining unit 331 may perform a function of determining whether the degradation improvement condition is satisfied according to obtaining a request related to the quality of the first image through the first application 310. According to an embodiment, the image condition determining unit 331 may perform a function of evaluating the quality of the first image through the image quality determining unit 332, and determining whether the degradation improvement condition is satisfied based on an evaluation result.

According to an embodiment, the multi-image degradation detecting unit 333 may detect a plurality of image degradations for each of the first image and/or the fourth image. According to an embodiment, the multi-image degradation improving unit 334 may improve the plurality of the degradations of the first image and/or the fourth image detected through the multi-image degradation detecting unit 333. According to an embodiment, the multi-image degradation improving unit 334 may set priorities to the plurality of the degradations, and process the plurality of the degradations of the image based on the priorities. According to an embodiment, the third application 330 may generate an image by processing the plurality of the degradations in each of the first image and/or the fourth image.

According to an embodiment, the image quality determining unit 332 may determine whether the criterion for improving the plurality of the degradations of the image is satisfied. For example, the image quality determining unit 332 may determine whether the criterion for improving the plurality of the degradations of the first image is satisfied.

According to an embodiment, to determine whether the criterion is satisfied, the image quality determining unit 332 may generate the first sample image based on the first image. For example, the image quality determining unit 332 may generate the first sample image downscaled from the first image. According to an embodiment, the image quality determining unit 332 may detect the plurality of the degradations of the first sample image using the multi-image degradation detecting unit 333. Next, the image quality determining unit 332 may generate the second sample image by improving the plurality of the image degradations using the multi-image degradation improving unit 334.

According to an embodiment, the image quality determining unit 332 may compare the first sample image and the second sample image using the AI algorithm. For example, the image quality determining unit 332 may determine a quality improvement level of the second sample image, by comparing with the first sample image. In an embodiment, if the quality of the second sample image is improved over a reference value compared with the first sample image, the image quality determining unit 332 may determine that the first image satisfies the criterion for improving the plurality of the degradations. In another embodiment, if the quality of the second sample image is not improved over a reference value compared with the first sample image, the image quality determining unit 332 may determine that the first image does not satisfy the criterion for improving the plurality of the degradations.

According to an embodiment, as a result of determining through the image quality determining unit 332, the first image may not satisfy the criterion for improving the plurality of the degradations. According to an embodiment, if the first image does not satisfy the criterion, the image degradation detecting unit 335 may detect one degradation from the plurality of the degradations of the first image detected through the multi-image degradation detecting unit 333. For example, the image degradation detecting unit 335 may detect the degradation of the highest priority among the plurality of the degradations. As another example, the image degradation detecting unit 335 may detect the worst degradation among the plurality of the degradations.

According to an embodiment, the image degradation improving unit 336 may improve the image degradation detected through the image degradation detecting unit 335. For example, the image degradation improving unit 336 may improve the degradation of the highest priority among the plurality of the degradations.

It has been described that, but not limited to, the function for improving the degradations of the first image and/or the fourth image is provided for the sake of explanation, and the electronic device 100 may improve the degradations of the image to improve the quality through the application stored in the memory 220.

Figure 4:
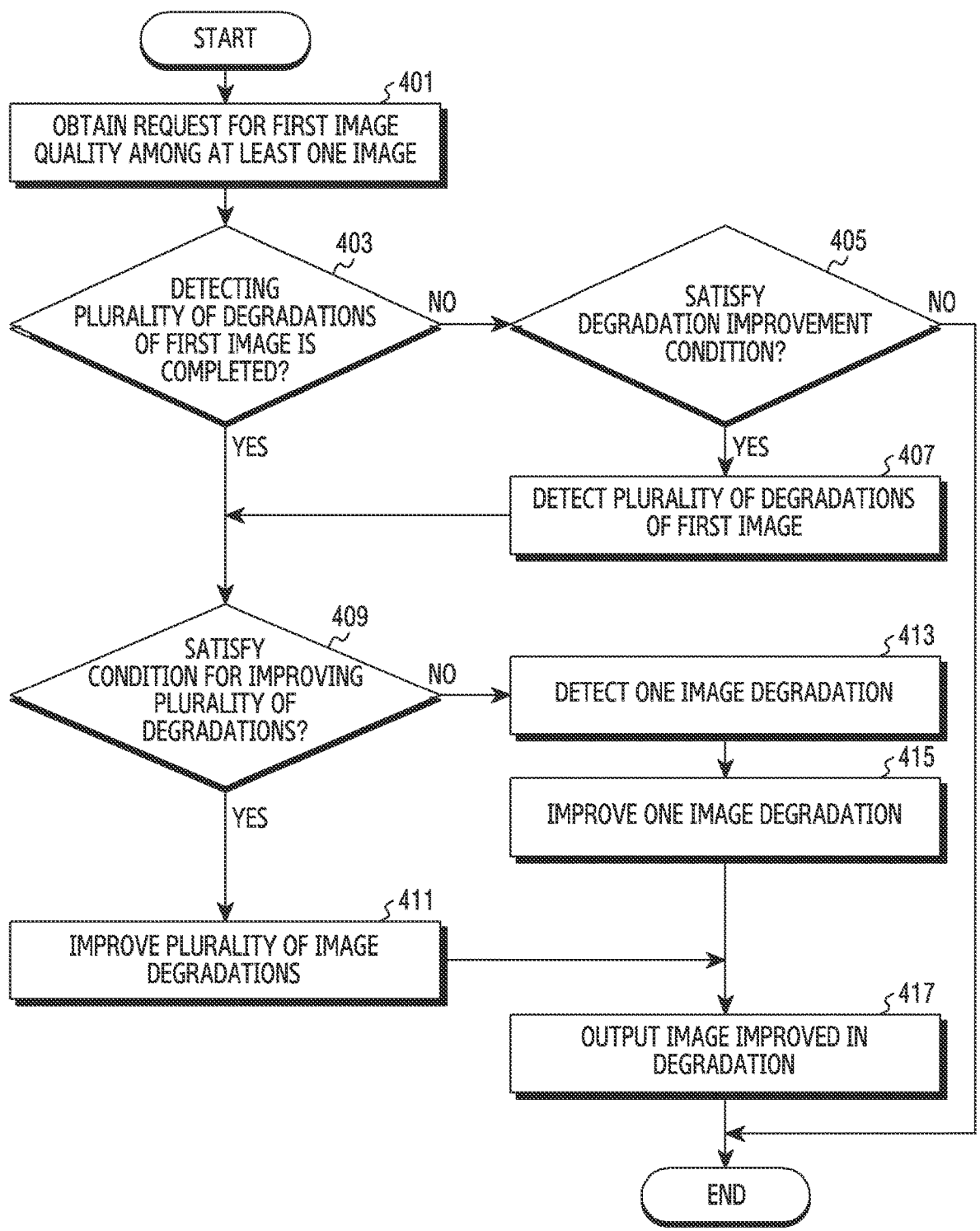
FIG. 4 is a flowchart showing that an electronic device outputs an image with degradations improved according to an embodiment of the disclosure.

FIG. 4 is a flowchart showing that an electronic device outputs an image with degradations improved according to an embodiment of the disclosure.

Referring to FIG. 4, in operation 401, an electronic device 100 may obtain a request indicating quality improvement of a first image (hereafter, a 'quality improvement request') among at least one image. For example, the electronic device 100 may obtain a user's touch input to the display 230, and obtain the quality improvement request of the first image among at least one image stored in the memory 220.

According to an embodiment, the electronic device 100 may determine whether detecting a plurality of degradations of the first image is completed in operation 403. For example, the electronic device 100 may execute the third application 330 and determine whether detecting the plurality of the degradations of the first image is completed through the multi-image degradation detecting unit 333. For example, in response to obtaining the request, the electronic device 100 may determine whether detecting the plurality of the degradations of the first image is performed in the idle state of the electronic device 100 before obtaining the request. According to an embodiment, to determine whether detecting the plurality of the degradations of the first image is performed, the electronic device 100 may refer to data stored in the memory 220. For example, in response to obtaining the request, the electronic device 100 may refer to metadata and/or linked data stored in the memory 220 together with the first image. As a result of referring to the metadata and/or the linked data, if degradation detection information of the first image is stored in the memory 220, the electronic device may determine that detecting the plurality of the degradations of the first image is performed.

According to an embodiment, if detecting the plurality of the degradations of the first image is not completed, the electronic device 100 may determine whether a degradation improvement condition is satisfied in operation 405. For example, the electronic device 100 may execute the third application 330 and determine whether the degradation improvement condition is satisfied through the image condition determining unit 331. According to an embodiment, in operation 405, if the degradation improvement condition is not satisfied, an operation of outputting the degradation improved image may be finished.

According to an embodiment, if the condition for improving the plurality of the degradations of the first image is satisfied, the electronic device 100 may detect the plurality of the degradations of the first image in operation 407. For example, the electronic device 100 may detect the plurality of the degradations of the first image by executing the third application 330.

According to an embodiment, the electronic device 100 may determine whether the first image satisfies the criterion for improving the plurality of the degradations in operation 409. For example, the electronic device 100 may determine whether the first image satisfies the criterion for improving the plurality of the degradations using the first sample image based on the first image described with reference to FIG. 3.

According to an embodiment, if the first image satisfies the criterion for improving the plurality of the degradations, the electronic device 100 may generate a second image by improving the plurality of the degradations of the first image. According to an embodiment, in operation 411, the electronic device 100 may improve the plurality of the degradations of the first image by executing the third application 330.

According to an embodiment, if the first image does not satisfy the criterion for improving the plurality of the degradations, the electronic device 100 may detect one image degradation from the plurality of the degradations of the first image in operation 413.

According to an embodiment, the electronic device 100 may improve the one image degradation in operation 415. For example, the electronic device 100 may detect the worst degradation from the plurality of the image degradations, and improve the detected image degradation. According to an embodiment, the electronic device 100 may generate a third image by improving the one image degradation of the first image in operation 415.

According to an embodiment, in operation 417, the electronic device 100 may output the image with the degradation improved. For example, the electronic device 100 may output the second image and/or the third image on the display 230. According to an embodiment, the electronic device 100 may output the second image together with the first image, or output the third image together with the first image, and thus output the image before the degradation improvement and the image of the improved degradation.

Figure 5:
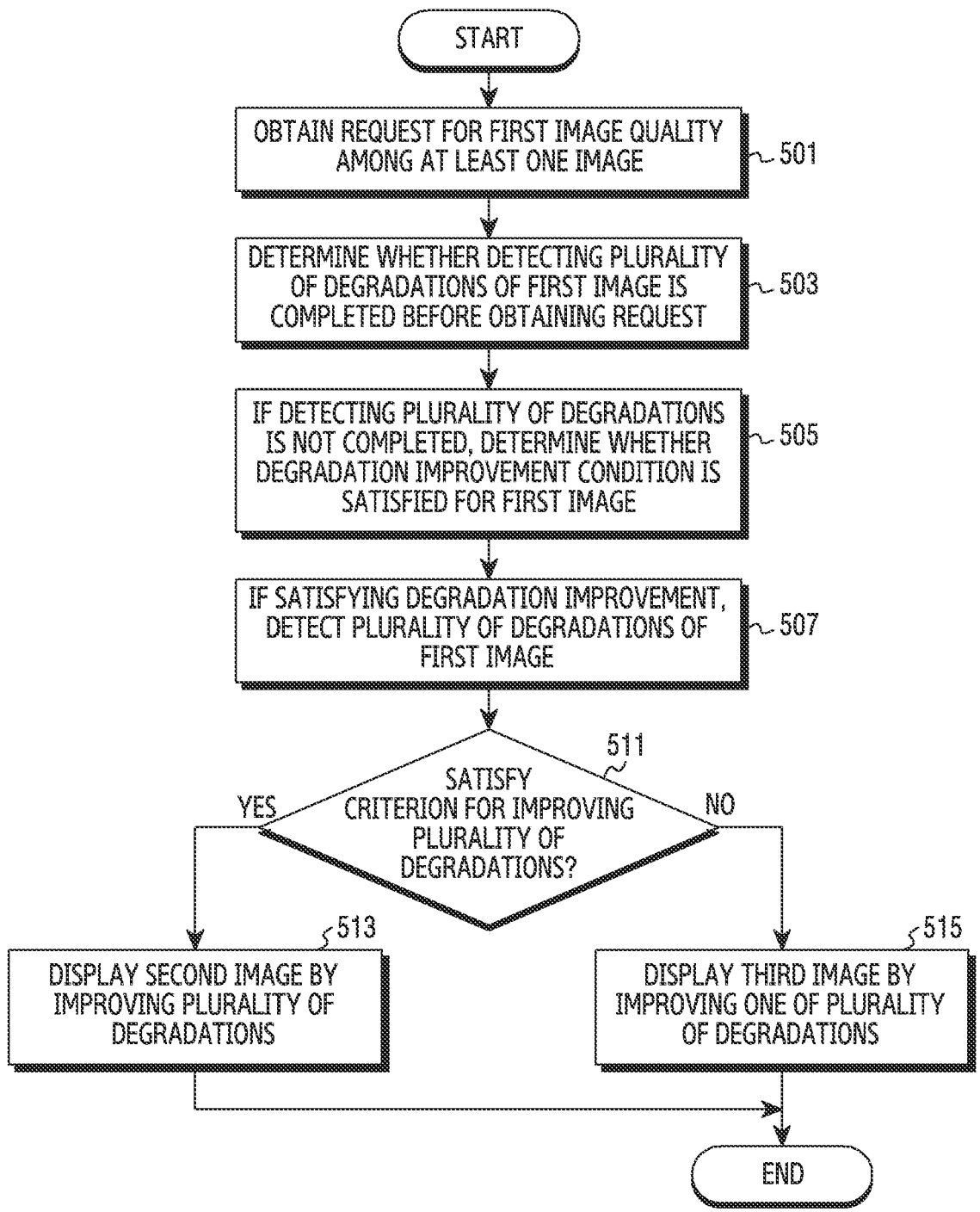
FIG. 5 is a flowchart showing that an electronic device outputs an image with degradations improved according to an embodiment of the disclosure.

FIG. 5 is a flowchart showing that an electronic device outputs an image with degradations improved according to an embodiment of the disclosure.

Referring to FIG. 5, a processor 210 may obtain a request for the quality of a first image among at least one image in operation 501. According to an embodiment, the request may be obtained through the first application 310.

According to an embodiment, in operation 503, the processor 210 may determine whether detecting a plurality of degradations of the first image is completed before obtaining the request for the quality of the first image. For example, if detecting the plurality of the degradations of the first image is completed, the processor 210 may determine whether improving the plurality of the degradations is completed.

According to an embodiment, before obtaining the request for the quality of the first image, if detecting and improving the plurality of the degradations of the first image is completed through the second application 320, the processor 210 may display the completely improved image on the display 230.

According to an embodiment, in operation 505, if detecting the plurality of the degradations is not completed, the processor 210 may determine a degradation improvement condition is satisfied with respect to the first image.

In an embodiment, if the first image does not satisfy the degradation improvement condition for the first image, the processor 210 may finish its operation.

According to an embodiment, in operation 507, in response to satisfying the degradation improvement condition, the processor 210 may detect the plurality of the degradations of the first image.

According to an embodiment, in operation 509, the processor 210 may determine whether a criterion for improving the plurality of the degradations of the first image is satisfied. For example, if processing the plurality of the degradations of the first image is recommended over processing one of the plurality of the degradations of the first image, the processor 210 may determine that the criterion is satisfied.

According to an embodiment, if the criterion is satisfied, the processor 210 may display a second image by improving the plurality of the degradations in operation 511. For example, the processor 210 may generate the second image by improving the plurality of the degradations of the first image, and display the generated second image on the display 230.

According to an embodiment, if the criterion is not satisfied, the processor 210 may display a third image by improving one of the plurality of the degradations in operation 513. For example, the processor 210 may generate the third image by improving one of the plurality of the degradations of the first image, and display the generated third image on the display 230.

FIG. 6 is a flowchart showing that an electronic device in an idle state detects and improves degradations in an image according to an embodiment of the disclosure.

According to an embodiment, if the electronic device 100 is idle, the processor 210 may perform operations described with reference to FIG. 6. For example, the processor 210 may determine a battery status and/or no execution of the electronic device 100 over a specific time and thus determine the idle state of the electronic device 100.

Referring to FIG. 6, if an electronic device 100 is idle, a processor 210 may determine whether there is an image added into a memory 220, in operation 601. For example, the processor 210 may determine whether there is the added image such as a newly captured image, an image shared on the SNS.

According to an embodiment, if there is an image added into the memory 220, the processor 210 may update the added image into the media database in operation 603.

According to an embodiment, if there is no image added into the memory 220, the processor 210 may extract an image to process from the media database, in operation 605. For example, the processor 210 may extract an image for the degradation improvement operation from at least one image included in the media database. According to an embodiment, the extracted image in operation 605 may be expressed hereafter as a fourth image.

According to an embodiment, in operation 607, the processor 210 may determine whether the fourth image is an image of which the degradation improvement is completed. The processor 210 may perform operation 613 if determining that the degradation improvement of the fourth image is completed.

According to an embodiment, if determining that the degradation improvement is not completed, in operation 609, the processor 210 may detect a plurality of image degradations. That is, the processor 210 may detect the plurality of the image degradations of the fourth image.

According to an embodiment, in operation 611, the processor 210 may improve the plurality of the image degradations. For example, the processor 210 may improve the plurality of the image degradations of the fourth image detected in operation 609.

According to an embodiment, the processor 210 may determine whether the electronic device 100 is idle in operation 613. For example, it may determine whether the state of the electronic device 100 is the not-in-use state during its charging. According to an embodiment, if the state of the electronic device 100 is not idle, the processor 210 may finish its operation.

According to an embodiment, if the state of the electronic device 100 is idle, in operation 615, the processor 210 may determine whether an image requiring the degradation improvement remains in the media database. If determining that an image requiring the degradation improvement remains, the processor 210 may perform operation 603.

Figure 7:
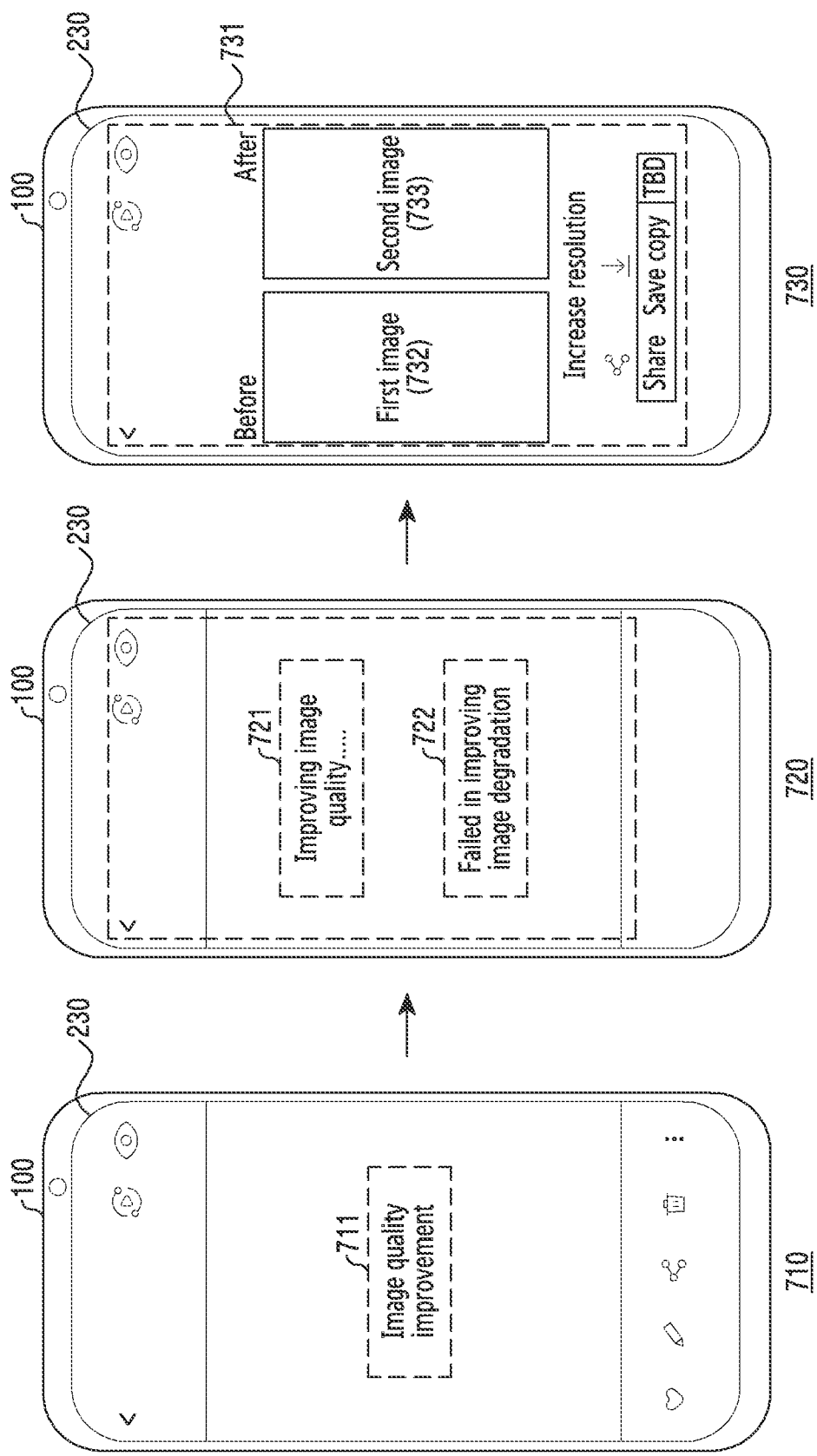
FIG. 7 is a diagram for explaining a screen which displays a first image and a second image improved in degradations, in an electronic device according to an embodiment of the disclosure.

FIG. 7 is a diagram for explaining a screen which displays a first image and an image improved in degradation, in an electronic device according to an embodiment of the disclosure.

Referring to FIG. 7, a first screen 710, a second screen 720 and a third screen 730 in which the electronic device 100 displays an image of the improved degradation on the display 230 are shown.

According to an embodiment, the first screen 710 shows a screen which executes an application for the image, by executing the first application 310. According to an embodiment, the first screen 710 may include various icons related to the first application execution. For example, the first screen 710 may include an icon 711 for the degradation improvement of the image.

According to an embodiment, the processor 210 may obtain a request related to the quality of a first image of at least one image stored in the memory 220. For example, the processor 210 may display the icon 711 for the degradation improvement on the display 230. According to an embodiment, the user of the electronic device 100 may make a request related to the image quality through the icon 711 for the degradation improvement.

According to an embodiment, the second screen 720 may include a degradation improvement guide screen related to the degradation improvement operation of the first image selected in the first screen 710. For example, the processor 210 may display on the display 230 a visual object 721 informing that the degradation improvement is conducted on the first image. As another example, if the first image does not satisfy a degradation improvement condition, the processor 210 may display a visual object 722 notifying no improvement on a plurality of image degradations. According to an embodiment, the processor 210 may display on the display 230 at least one visual object of the visual object 721 informing that the degradation improvement is conducted or the visual object 722 notifying no improvement on the plurality of the degradations according to an image degradation improvement performance status.

According to an embodiment, the third screen 730 may include a comparison screen 731 including the first image and the completely improved image. According to an embodiment, the processor 210 may perform the degradation improvement on the first image, and generate and display the image improved in degradation on the display 230. For example, the processor 210 may display on the display 230 a first image 732 and a second image 733 improving plurality of degradations of the first image 732. As another example, the processor 210 may display on the display 230 the first image 732 and a third image (not shown) improving one of the plurality of the degradations of the first image 732.

Figure 8:
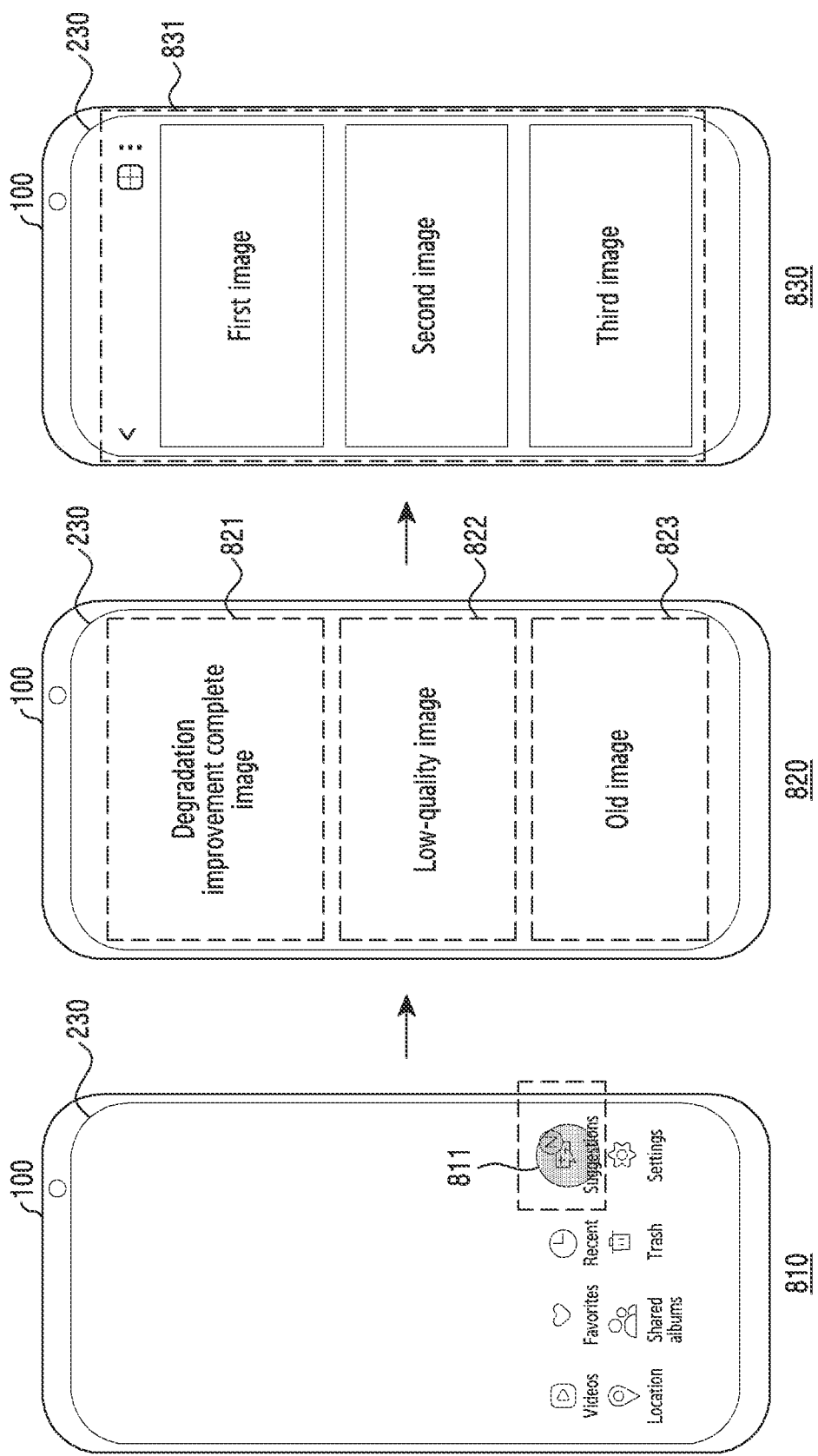
FIG. 8 is a diagram for explaining a screen which displays an image improved in degradation in an idle state, in an electronic device according to an embodiment of the disclosure.

FIG. 8 is a diagram for explaining a screen which displays an image improved in degradation in an idle state, in an electronic device according to an embodiment of the disclosure.

Referring to FIG. 8, screen representing images of which degradations are detected and completely improved by the second application 320 in the idle state of an electronic device 100 are shown.

According to an embodiment, the processor 210 may display on the display 230 a fourth screen 810 including a recommendation icon 811 for identifying images of which the degradation detection and improvement of the images are completed.

According to an embodiment, in response to obtaining a request for the recommendation icon 811 included in the fourth screen 810, the processor 210 may display a fifth screen 820 on the display 230.

According to an embodiment, the fifth screen 820 may include a degradation improvement complete image 821 of which the degradation detection and improvement are completed in the idle state of the electronic device 100. The degradation improvement complete image 821 according to an embodiment may be an image improving at least one degradation included in the image through the operations described with reference to FIG. 4 through FIG. 6. In addition, the fifth screen 820 may include a low-quality image 822 determined to be lower than a reference value in quality through the image quality determining unit 332 of the third application 330. The fifth screen 820 may include an old image 823 which passes over a specific reference time after it is stored among at least one image stored in the memory 220. According to an embodiment, the processor 210 may classify at least one image stored in the memory 220 into specific categories (e.g., the degradation improvement complete image 821, the low-quality image 822 and the old image 823) and display in the fifth screen 820 on the display 230.

According to an embodiment, a sixth screen 830 may include an image of one category selected from the categories included in the fifth screen 820. For example, if the remaster image (e.g., the degradation improvement complete image 821) is selected from the images included in the fifth screen 820, the sixth screen 830 may include an image list 831 including degradation improvement completed images (e.g., a first image, a second image and/or a third image) among at least one image stored in the memory 220.

As stated above, according to an embodiment, an electronic device (e.g., the electronic device 100 of FIG. 2) may include a memory (e.g., the memory 220 of FIG. 2) for storing at least one image, a display (e.g., the display 230 of FIG. 2), and at least one processor (e.g., the processor 210 of FIG. 2) electrically connected with the memory and the display, and the at least one processor may obtain a request related to a quality of a first image among the at least one image, in response to the request, determine whether detecting a plurality of degradations of the first image is completed before obtaining the request, as a result of determining, if detecting the plurality of the degradations is not completed, determine whether a degradation improvement condition is satisfied for the first image, detect the plurality of the degradations in response to satisfying the degradation improvement condition, determine whether a criterion for improving the plurality of the degradations is satisfied, in response to satisfying the criterion, display on the display a second image in which degradation improvement is performed on the plurality of the degradations, and if the criterion is not satisfied, display on the display a third image in which degradation improvement is performed on one of the plurality of the degradations.

According to an embodiment, in response to completing the detection of the plurality of the degradations, the at least one processor may determine whether the criterion for improving the plurality of the degradations is satisfied.

According to an embodiment, if the criterion is satisfied and there is an image in which degradation improvement is performed on the plurality of the degradations, the at least one processor may control the display to display the image on which the degradation improvement is performed.

According to an embodiment, in response to not satisfying the degradation improvement condition, the at least one processor may control the display to display a notification indicating no improvement of the plurality of the degradations.

According to an embodiment, the at least one processor may generate a first sample image based on the first image, detect a plurality of degradations of the first sample image, generate a second sample image by improving the plurality of the degradations of the first sample image, compare the first sample image and the second sample image using an AI algorithm, and determine whether the criterion for improving the plurality of the degradations is satisfied based on the comparison result.

According to an embodiment, the at least one processor may set priorities to the plurality of the degradations, and generate the third image by improving the degradation of the highest priority among the plurality of the degradations.

According to an embodiment, the at least one processor may control the display to display the first image and the second image together or to display the first image and the third image together.

According to an embodiment, the at least one processor may determine whether the electronic device is idle, and if the electronic device is idle, determine whether the at least one image includes a fourth image of which degradation detection is not completed.

According to an embodiment, the at least one processor may detect a plurality of degradations of the fourth image, and improve the plurality of the degradations of the fourth image.

According to an embodiment, the at least one processor may set priorities to the at least one image, and determine whether the degradation detection is completed based on the priorities of the at least one image.

According to an embodiment as set forth above, an operating method of an electronic device including a memory (e.g., the memory 220 of FIG. 2) which stores at least one image, may include obtaining a request related to a quality of a first image among the at least one image, in response to the request, determining whether detecting a plurality of degradations of the first image is completed before obtaining the request, as a result of determining, if detecting the plurality of the degradations is not completed, determining whether a degradation improvement condition is satisfied for the first image, in response to satisfying the degradation improvement condition, detecting the plurality of the degradations, determining whether a criterion for improving the plurality of the degradations is satisfied, and based on whether the criterion is satisfied, displaying a second image in which degradation improvement is performed on the plurality of the degradations or a third image in which degradation improvement is performed on one of the plurality of the degradations.

According to an embodiment, the operating method of the electronic device may include, in response to satisfying the criterion for improving the plurality of the degradations, generating the second image improving the plurality of the degradations.

According to an embodiment, the operating method of the electronic device may include, in response to not satisfying the criterion for improving the plurality of the degradations, generating the third image improving the one degradation.

According to an embodiment, the operating method of the electronic device may further include, setting priorities to the plurality of the degradations, and generating the third image may include generating the third image by improving the degradation of the highest priority among the plurality of the degradations.

According to an embodiment, determining whether the criterion for improving the plurality of the degradations is satisfied may include generating a first sample image based on the first image, detecting a plurality of degradations of the first sample image, generating a second sample image by improving the plurality of the degradations of the first sample image, comparing the first sample image and the second sample image using an AI algorithm, and determining whether the criterion for improving the plurality of the degradations is satisfied based on the comparison result.

As set forth above, an electronic device (e.g., the electronic device 100 of FIG. 2) according to an embodiment may include a memory (e.g., the memory 220 of FIG. 2) for storing at least one image, a first application, a second application and a third application, a display (e.g., the display 230 of FIG. 2), and at least one processor (e.g., the processor 210 of FIG. 2) electrically connected with the memory and the display, and the at least one processor may obtain a request related to a quality of a first image among the at least one image by executing the first application, in response to the request, determine whether detecting a plurality of degradations of the first image is completed before obtaining the request, as a result of determining, in response to not completing the detection of the plurality of the degradations, determine whether a degradation improvement condition is satisfied for the first image by executing the third application, in response to satisfying the degradation improvement condition, detect the plurality of the degradations, determine whether a criterion for improving the plurality of the degradations is satisfied, in response to satisfying the criterion, generate a second image in which degradation improvement is performed on the plurality of the degradations, in response to not satisfying the criterion, generate a third image in which degradation improvement is performed on one of the plurality of the degradations, and control the display to display the second image or the third image through the first application.

According to an embodiment, the at least one processor may determine whether the electronic device is idle, in response to the idle electronic device, determine whether there is a fourth image in which the degradation improvement is not completed among the at least one image by executing the second application, detect a plurality of degradations of the fourth image, and improve the plurality of the degradations of the fourth image.

According to an embodiment, in response to not satisfying the degradation improvement condition, the at least one processor may control the display to display a notification indicating no improvement on the plurality of the degradations by executing the first application.

According to an embodiment, by executing the third application, the at least one processor may generate a first sample image based on the first image, detect a plurality of degradations of the first sample image, generate a second sample image by improving the plurality of the degradations of the first sample image, compare the first sample image and the second sample image using an AI algorithm, and determine the criterion for improving the plurality of the degradations is satisfied based on the comparison result.

According to an embodiment, the at least one processor may set priorities to the plurality of the degradations by executing the second application, and generate the third image by improving the degradation of the highest priority among the plurality of the degradations by executing the third application.

Figure 9:
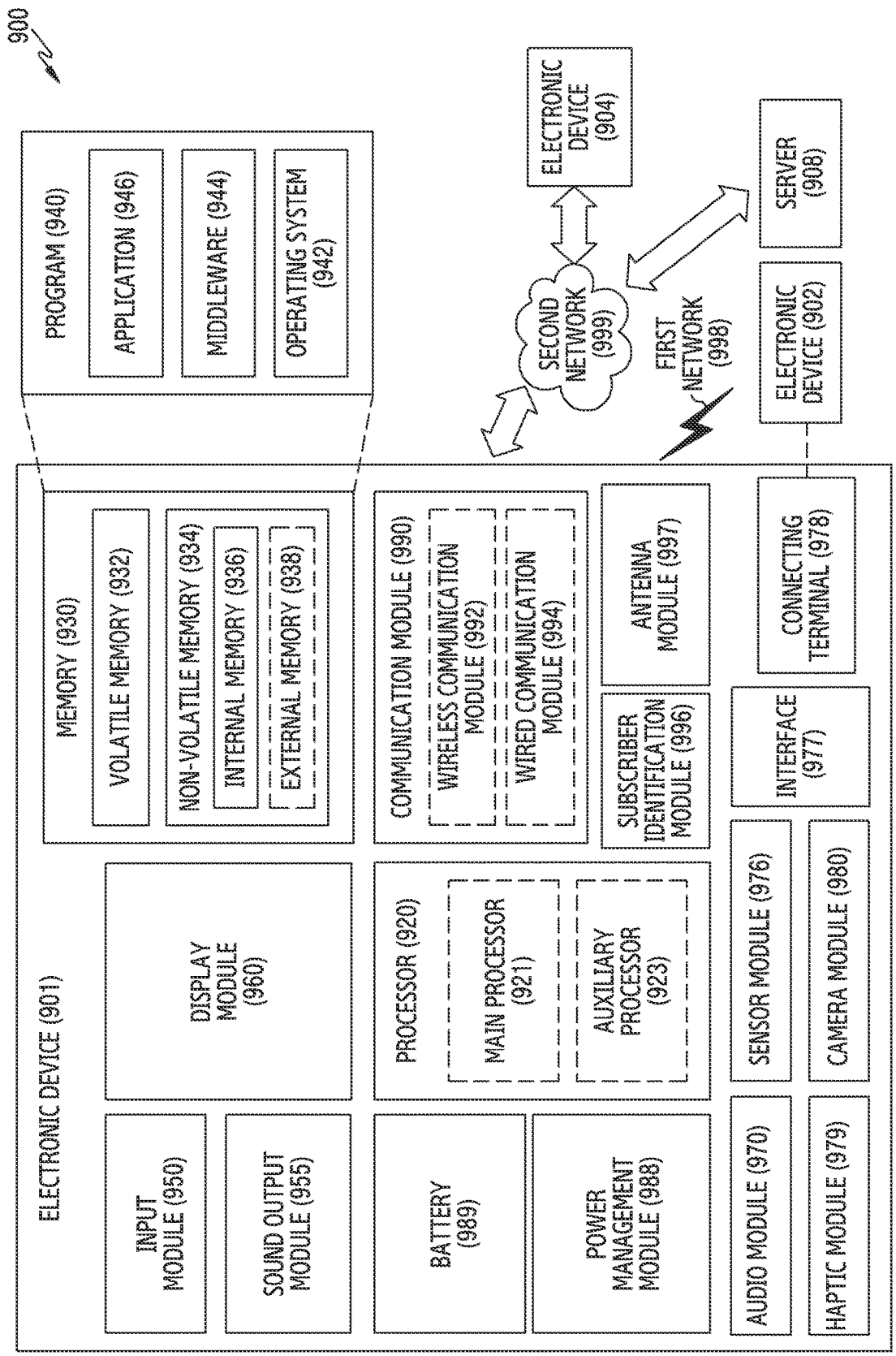
FIG. 9 is a block diagram illustrating an electronic device in a network environment 900 according to an embodiment of the disclosure.

FIG. 9 is a block diagram illustrating an electronic device in a network environment according to an embodiment of the disclosure.

Referring to FIG. 9, an electronic device 901 in a network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, Wi-Fi direct, or infrared data association (IrDA)) or the second network 999 (e.g., a long-range communication network, such as a legacy cellular network, a $5^{th}$ Generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a $4^{th}$ Generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
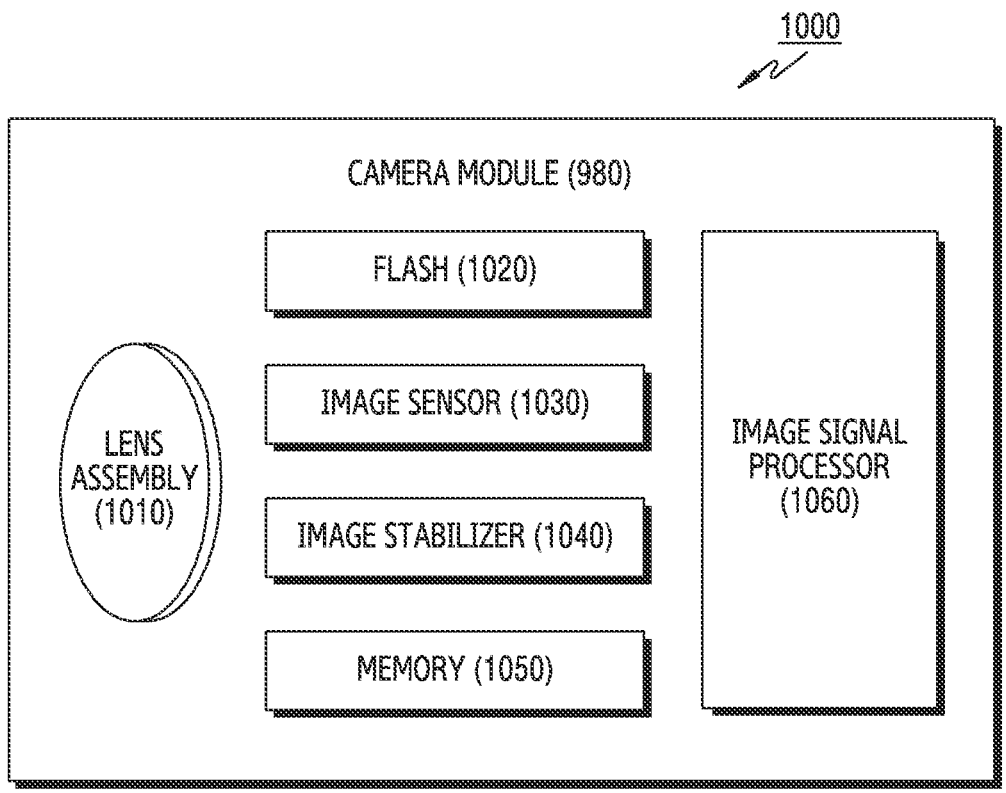
FIG. 10 is a block diagram illustrating the camera module according to an embodiment of the disclosure.

FIG. 10 is a block diagram illustrating a camera module according to an embodiment of the disclosure.

Referring to FIG. 10 depicting block diagram 1000, the camera module 980 may include a lens assembly 1010, a flash 1020, an image sensor 1030, an image stabilizer 1040, memory 1050 (e.g., buffer memory), or an image signal processor 1060. The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer.

The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display module 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may perform one or more image processing with respect to an image obtained via the image sensor 1030 or an image stored in the memory 1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display module 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display module 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory for storing at least one image;
a display; and
at least one processor electrically connected with the memory and the display,
wherein the at least one processor is configured to:
obtain a request related to a quality of a first image among the at least one image,
in response to the request, determine whether detecting a plurality of degradations of the first image is completed before obtaining the request,
as a result of determining, in response to detecting the plurality of the degradations not being completed, determine whether a degradation improvement condition is satisfied for the first image,
detect the plurality of the degradations in response to satisfying the degradation improvement condition,
determine whether a criterion for improving the plurality of the degradations is satisfied,
in response to satisfying the criterion, display on the display a second image in which degradation improvement is performed on the plurality of the degradations, and
in response to the criterion not being satisfied, display on the display a third image in which degradation improvement is performed on one of the plurality of the degradations.

2. The electronic device of claim 1, wherein, in response to completing the detection of the plurality of the degradations, the at least one processor is further configured to determine whether the criterion for improving the plurality of the degradations is satisfied.

3. The electronic device of claim 1, wherein, in response to the criterion being satisfied and there being an image in which degradation improvement is performed on the plurality of the degradations, the at least one processor is further configured to control the display to display the image on which the degradation improvement is performed.

4. The electronic device of claim 1, wherein, in response to not satisfying the degradation improvement condition, the at least one processor is further configured to control the display to display a notification indicating no improvement of the plurality of the degradations.

5. The electronic device of claim 1, wherein the at least one processor is further configured to:
generate a first sample image based on the first image,
detect a plurality of degradations of the first sample image,
generate a second sample image by improving the plurality of the degradations of the first sample image, compare the first sample image and the second sample image using an artificial intelligence (AI) algorithm, and determine whether the criterion for improving the plurality of the degradations is satisfied based on a result of the comparison.

6. The electronic device of claim 1, wherein the at least one processor is further configured to:
set priorities to the plurality of the degradations, and
generate the third image by improving a degradation of a highest priority among the plurality of the degradations.

7. The electronic device of claim 1, wherein the at least one processor is further configured to control the display to display the first image and the second image together or to display the first image and the third image together.

8. The electronic device of claim 1, wherein the at least one processor is further configured to:
determine whether the electronic device is idle, and
in response to the electronic device being idle, determine whether the at least one image comprises a fourth image of which degradation detection is not completed.

9. The electronic device of claim 8, wherein the at least one processor is further configured to:
detect a plurality of degradations of the fourth image, and
improve the plurality of the degradations of the fourth image.

10. The electronic device of claim 8, wherein the at least one processor is further configured to:
set priorities to the at least one image, and
determine whether the degradation detection is completed based on the priorities of the at least one image.

11. An operating method of an electronic device comprising a memory which stores at least one image, the method comprising:
obtaining a request related to a quality of a first image among the at least one image;
in response to the request, determining whether detecting a plurality of degradations of the first image is completed before obtaining the request;
as a result of determining, if detecting the plurality of the degradations is not completed, determining whether a degradation improvement condition is satisfied for the first image;
in response to satisfying the degradation improvement condition, detecting the plurality of the degradations;
determining whether a criterion for improving the plurality of the degradations is satisfied; and
based on whether the criterion is satisfied, displaying a second image in which degradation improvement is performed on the plurality of the degradations or a third image in which degradation improvement is performed on one degradation of the plurality of the degradations.

12. The operating method of claim 11, further comprising:
in response to satisfying the criterion for improving the plurality of the degradations, generating the second image improving the plurality of the degradations.

13. The operating method of claim 11, further comprising:
in response to not satisfying the criterion for improving the plurality of the degradations, generating the third image improving the one degradation.

14. The operating method of claim 13, further comprising:
setting priorities to the plurality of the degradations,
wherein generating the third image comprises generating the third image by improving a degradation of a highest priority among the plurality of the degradations.

15. The operating method of claim 11, wherein the determining of whether the criterion for improving the plurality of the degradations is satisfied comprises:
generating a first sample image based on the first image;
detecting a plurality of degradations of the first sample image;
generating a second sample image by improving the plurality of the degradations of the first sample image;
comparing the first sample image and the second sample image using an artificial intelligence (AI) algorithm; and
determining whether the criterion for improving the plurality of the degradations is satisfied based on a result of the comparison.

16. An electronic device comprising:
a memory for storing at least one image, a first application, a second application and a third application;
a display; and
at least one processor electrically connected with the memory and the display,
wherein the at least one processor is configured to:
obtain a request related to a quality of a first image among the at least one image by executing the first application,
in response to the request, determine whether detecting a plurality of degradations of the first image is completed before obtaining the request,
as a result of determining, in response to not completing the detection of the plurality of the degradations, determine whether a degradation improvement condition is satisfied for the first image by executing the third application,
in response to satisfying the degradation improvement condition, detect the plurality of the degradations,
determine whether a criterion for improving the plurality of the degradations is satisfied,
in response to satisfying the criterion, generate a second image in which degradation improvement is performed on the plurality of the degradations,
in response to not satisfying the criterion, generate a third image in which degradation improvement is performed on one of the plurality of the degradations, and
control the display to display the second image or the third image through the first application.

17. The electronic device of claim 16, wherein the at least one processor is further configured to determine whether the electronic device is idle, and in response to the electronic device being idle:
determine whether there is a fourth image in which the degradation improvement is not completed among the at least one image by executing the second application,
detect a plurality of degradations of the fourth image, and
improve the plurality of the degradations of the fourth image.

18. The electronic device of claim 16, wherein, in response to not satisfying the degradation improvement condition, the at least one processor is further configured to control the display to display a notification indicating no improvement on the plurality of the degradations by executing the first application.

19. The electronic device of claim 16, wherein, by executing the third application, the at least one processor is further configured to:
generate a first sample image based on the first image,
detect a plurality of degradations of the first sample image, generate a second sample image by improving the plurality of the degradations of the first sample image, compare the first sample image and the second sample image using an artificial intelligence (AI) algorithm, and determine the criterion for improving the plurality of the degradations is satisfied based on a result of the comparison.

20. The electronic device of claim 16, wherein the at least one processor is further configured to:

set priorities to the plurality of the degradations by executing the second application, and generate the third image by improving a degradation of a highest priority among the plurality of the degradations by executing the third application.

* * * * *